US005162969A

United States Patent [19]

Leung

[11] Patent Number: 5,162,969

[45] Date of Patent: Nov. 10, 1992

[54] DIELECTRIC PARTICLE INJECTOR FOR MATERIAL PROCESSING

[75] Inventor: Philip L. Leung, La Canada, Calif.

[73] Assignee: California Institute of Technology, Pasadena, Calif.

[21] Appl. No.: 766,617

[22] Filed: Sep. 26, 1991

[51] Int. Cl.[5] ........................ B05B 5/00; G01D 15/00

[52] U.S. Cl. ........................................ 361/225; 346/159

[58] Field of Search ................................ 361/225-229; 346/159; 250/251

[56] References Cited

U.S. PATENT DOCUMENTS 4,255,777 3/1981 Kelly .................................. 361/228

4,748,043 5/1988 Seaver et al. ......................... 427/30

4,918,468 4/1990 Miekka et al. ...................... 346/159

*Primary Examiner*—Donald A. Griffin

*Attorney, Agent, or Firm*—John J. Posta, Jr.

[57] ABSTRACT

A device for use as an electrostatic particle or droplet injector is disclosed which is capable of injecting dielectric particles or droplets. The device operates by first charging the dielectric particles or droplets using ultraviolet light induced photoelectrons from a low work function material plate supporting the dielectric particles or droplets, and then ejecting the charged particles or droplets from the plate by utilizing an electrostatic force. The ejected particles or droplets are mostly negatively charged in the preferred embodiment; however, in an alternate embodiment, an ion source is used instead of ultraviolet light to eject positively charged dielectric particles or droplets.

25 Claims, 2 Drawing Sheets

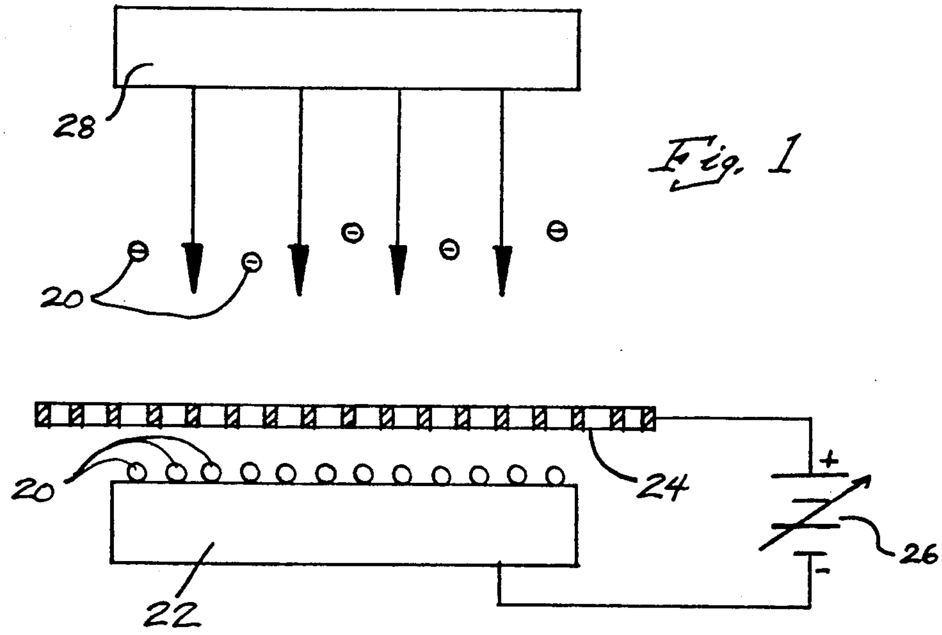
Fig. 1
Fig. 3
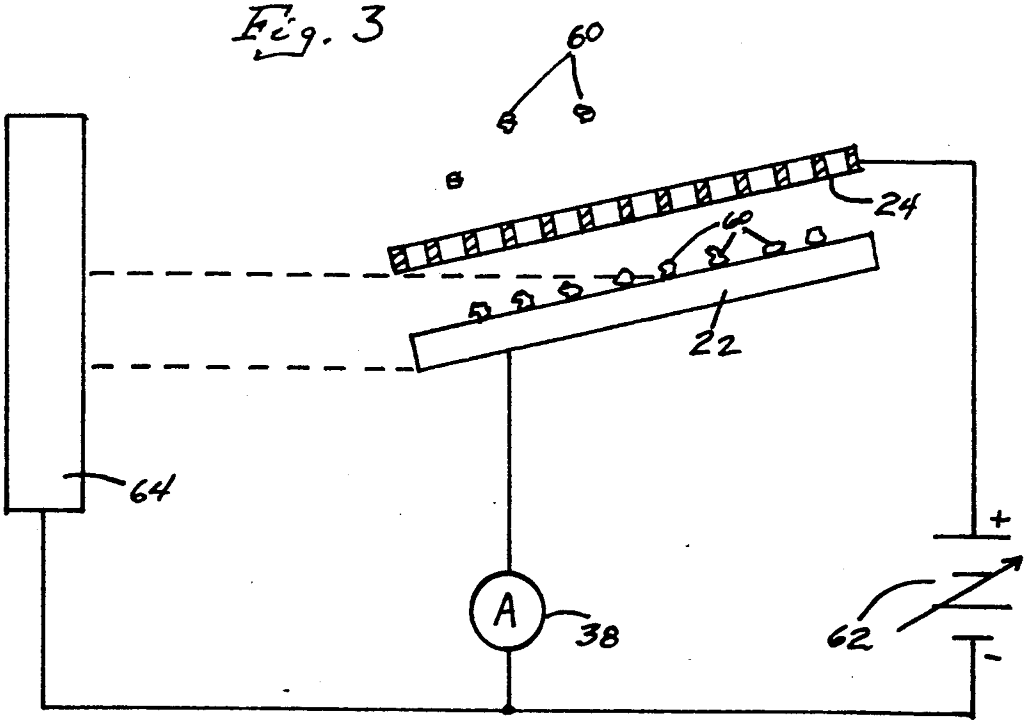

DIELECTRIC PARTICLE INJECTOR FOR MATERIAL PROCESSING

ORIGIN OF THE INVENTION

The invention described herein was made in the performance of work under a NASA Contract, and is subject to the provisions of Public Law 96-517 (35 U.S.C. 202) in which the Contractor has elected to retain title.

BACKGROUND OF THE INVENTION

1. Field of the Invention

The present invention relates generally to electrostatic particle or droplet injectors, and more particularly to an apparatus and related method for injecting dielectric particles or droplets by first charging the dielectric particles or droplets using ultraviolet light induced photoelectrons, and then ejecting the charged particles or droplets by utilizing an electrostatic force.

2. Description of Background Information

Charged droplet atomizers are well known in the art, and have been used for a wide variety of applications. Commonly, such atomizers use electrostatic force to form an atomized field of small droplets, which droplets are preferably of relatively uniform size. This technique involves the use of a high voltage to electrostatically atomize the fluid into small droplets.

Two typical examples of such electrostatic atomizers are found in U.S. Pat Nos. 4,255,777, to Kelly, and in 4,748,043, to Seaver et al. The Kelly patent induces a free excess charge on fluid contained within a housing chamber using at least two electrodes. The fluid containing the free excess charge is supplied to a spray mechanism, and is accelerated outwardly into small droplets by a strong electrostatic field generated by a ground electrode. The droplets are accelerated toward the ground electrode, and pass through one or more apertures in the ground electrode.

The Seaver et al. patent uses a first electric field between a plurality of needles and a plate, with the needles being disposed concentrically with respect to holes in the plate to cause a mist of highly charged droplets to be emitted from the needles. A second electric field is used to draw the droplets to the surface of an object to be coated with a thin but uniform coating. Both the Kelly patent and the Seaver et al. patent thus use an electrostatic atomizer to generate a mist of droplets.

The point which needs to be made is that both of these references are limited to the use of generating a mist of conductive droplets for the desired purpose. If the liquid is not conductive, the atomizers will not work. Similarly, it would not be possible using conventional electrostatic techniques to inject particles, unless the particles are made of a conductive material.

In most situations, the use of particles or droplets which are made of a conductive material has not presented a problem. However, recently a problem occurred which made it desirable to be able to inject particles made of nonconductive dielectric material. A brief description of the nature of the problem encountered is helpful to the understanding of the necessity of a dielectric particle injector.

During the Magellan mission to Venus, a number of anomalous events were observed in the use of the star scanner. The star scanner is a light sensitive device used to calibrate the attitude control system of the spacecraft. The events involved the detection of false incidences in which the star scanner indicated the detection of a star when in fact no star was in a position to be detected.

After a number of other possible causes for the false incidences were identified and ruled out, the possibility of particulates released from the surface of the spacecraft reflecting sunlight into the star scanner was indicated as the most likely possibility. The outer surface of the spacecraft was astroquartz, and it was suspected that these particles were the cause of the false incidences detected by the star scanner. It was hypothesized that the particles were released from the astroquartz surface of the spacecraft due to thermal shock when the astroquartz was exposed to the sunlight.

In order to confirm the theories advanced as to the cause of the star scanner anomalies, it was necessary to run several experiments in which dielectric particles were charged and released by a particle injector device.

Accordingly, it is the primary objective of the present invention that it provide an apparatus and a method for injecting dielectric particles in a manner analogous to conventional particle injection of conductive droplets and particles.

Thus, it is an objective of the present invention that a charge must initially be placed on the dielectric particles or droplets in order to provide a manner of controlling the ensuing movement of the dielectric particles or droplets. Appropriate apparatus and a suitable method must be developed to accomplish this objective.

It is a further objective that the appropriately charged dielectric particles or droplets be ejected into a desired area using an electrostatic force. The charged dielectric particles or droplets may then be maintained in the desired area through electrostatic confinement.

It is a still further objective of the present invention that the dielectric particles or droplets may be charged either negatively or positively by varying the charging technique. It is another objective of the present invention that the apparatus used be relatively compact and inexpensive, both to construct, as well as to operate and maintain. Finally, it is also an objective that all of the aforesaid advantages and objectives of the present invention be achieved without incurring any substantial relative disadvantage.

SUMMARY OF THE INVENTION

The disadvantaqes and limitations of the background art discussed above are overcome by the present invention. With this invention, a particle injector and related method are disclosed which are suitable for charging and injecting dielectric particles or droplets. The present invention operates by first using ultraviolet (UV) light induced photoelectrons to charge the dielectric particles.

The dielectric particles or droplets to be injected are placed on the surface of a flat metallic plate made of material having a low work function, such as zinc or nickel. A UV source having a wavelength of between 2000 and 3000 Angstroms is used to illuminate the surface of the flat plate. Photoelectrons emitted from the surface of the flat plate will charge the dielectric particles or droplets.

The present invention next uses electrostatic force to eject the charged dielectric particles or droplets from the flat plate. This is accomplished by connecting the side of a high voltage DC power source having the same charge as that of the charged dielectric particles or droplets to the flat plate. The other side of the DC power source is connected to a metallic screen spaced away from the flat plate. The charged dielectric particles or droplets will be ejected from the surface of the flat plate through the screen and into a desired area. Electrostatic confinement, such as electrostatic levitation techniques well known in the art, may then be used to maintain the charged dielectric particles in the desired area.

It may therefore be seen that the present invention teaches an apparatus and a method for injecting dielectric particles in a manner analogous to conventional particle injection of conductive droplets and particles.

The present invention accomplishes this in two stages. Initially, a charge is placed on the dielectric particles or droplets in order to provide a manner of controlling the ensuing movement of the dielectric particles or droplets.

Next, the appropriately charged dielectric particles or droplets are ejected into a desired area using electrostatic force. The charged dielectric particles or droplets are then maintained in the desired area through electrostatic confinement.

The present invention allows the dielectric particles or droplets to be charged either negatively or positively by varying the charging technique. The apparatus of the present invention is relatively compact and inexpensive, both to construct, and to operate and maintain as well. Finally, all of the aforesaid advantages and objectives of the present invention are achieved without incurring any substantial relative disadvantage.

BRIEF DESCRIPTION OF THE DRAWINGS

These and other advantages of the present invention are best understood with reference to the drawings, in which:

FIG. 1 is a schematic depiction of the particle injector of the present invention using a UV source to induce the emission of photoelectrons used to charge dielectric particles;

FIG. 3 is a schematic depiction of an alternate embodiment particle injector using an ion beam to induce a positive charge in dielectric particles.

DETAILED DESCRIPTION OF THE PREFERRED EMBODIMENT

Figure 2:
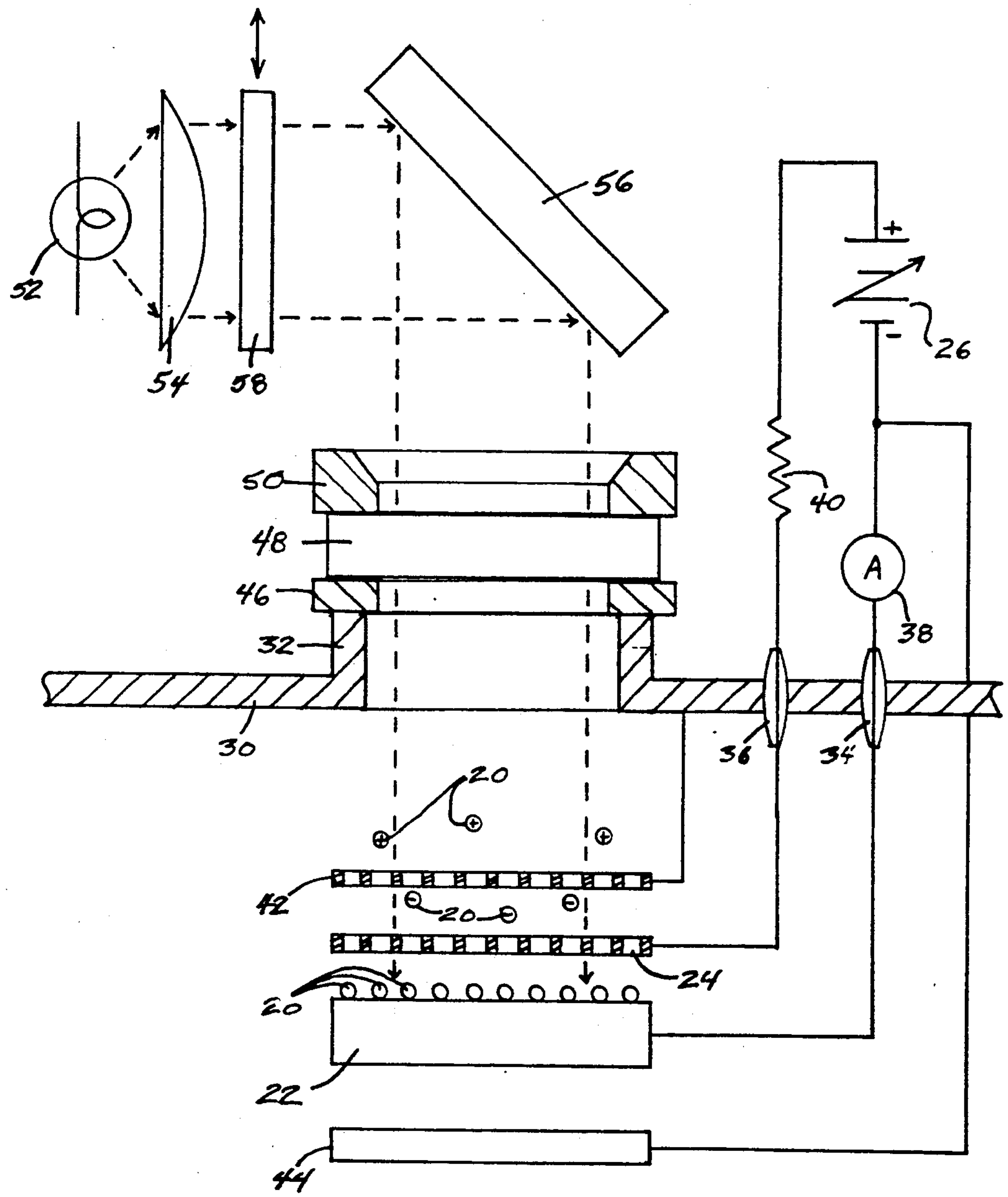
FIG. 2 is a schematic depiction of a particle injector similar to the one shown in FIG. 1, with the lamp, lenses, and mirror of the UV source illustrated, and also showing additional shielding elements.

The preferred embodiment of the present invention is schematically illustrated in its simplest form in FIG. 1. For purposes of the example used herein in FIG. 1 (and in the example used in FIG. 2 as well), the particle injector will be used to inject dielectric particles 20 rather than dielectric droplets, although the teachings of the present invention are equally applicable to the injection of dielectric droplets.

The dielectric particles 20 used both in FIG. 1 and in FIG. 2 may be, for example, mioroballoons, which are small, hollow, spherical balls made of ordinary, normal density glass. Such microballoons would preferably be approximately 60 microns in diameter, and would float with neutral buoyancy in water.

Referring now to FIG. 1, the dielectric particles 20 are placed on the top surface of a flat plate 22, which plate 22 is made from a low work function material. In the preferred embodiment, the material of the plate 22 is zinc (nickel may also be used). A flat, highly transparent, coarse wire grid 24 is located above and parallel to the top surface of the plate 22. The wire grid 24, which is made of a conductive metal, is located approximately one to two centimeters above the surface of the plate 22, although this distance may vary with the characteristics of the dielectric particles 20 to be injected.

A high voltage DC power source 26 has its negative side electrically connected to the plate 22, and its positive side connected to the wire grid 24. The high voltage DC power source 26 preferably has an adjustable voltage between zero and 10,000 Volts. In the preferred embodiment, the voltage supplied by the high voltage DC power source 26 will be approximately 1000 Volts, although the voltage may vary with the characteristics of the dielectric particles 20 to be injected.

A UV source 28 producing UV light having a wavelength in the 2000 to 3000 Angstrom range is used to illuminate the top surface of the plate 22. Since the preferred material of the plate 22, zinc, has a low work function characteristic, photoelectrons are readily emitted from the surface of the plate 22. Of course, since the dielectric particles 20 are made of a dielectric material with a work function higher than than the energy of the UV source 28, no photoelectrons will be emitted from the surfaces of the dielectric particles 20.

The photoelectrons emitted from the surface of the plate 22 will become attached to some of the dielectric particles 20, causing these dielectric particles 20 to become negatively charged. Immediately as soon as these dielectric particles 20 become negatively charged, the external electric field caused by the relative negative charge of the plate 22 will tend to repel these negatively charged dielectric particles 20 away from the top surface of the plate 22.

The positive charge on the wire grid 24 will also tend to attract the negatively charged dielectric particles 20 in an upward direction. Thus, the negatively charged dielectric particles 20 will be repelled from the plate 22 and toward the wire grid 24. However, due to the coarseness of the wire grid 24 and the small size of the dielectric particles 20, most of the negatively charged dielectric particles 20 will pass upwardly through the wire grid 24, as shown in FIG. 1.

The negatively charged dielectric particles 20 passing upwardly through the wire grid 24 may then be trapped in a confined area by using the proper electrostatic levitation and confinement field geometry. The principles of electrostatic levitation and confinement fields are well known in the art.

It should be noted that in testing, the dielectric particles 20 were ejected from the top surface of the plate 22 at 1000 Volts. This voltage was required to overcome both gravity and adhesion forces, which tend to hold the dielectric particles 20 to the top surface of the plate 22. In a microgravity environment, the electrostatic force required for particle injection would be significantly reduced.

Referring next to FIG. 2, the dielectric particles 20 are again placed on the top surface of the plate 22, which is again preferably made of a low work function material such as zinc. The wire grid 24 is again placed over and parallel to the top surface of the plate 22. The wire grid 24 is preferably spaced away from the top surface of the plate 22 by approximately two centimeters.

The plate 22 and the wire grid 24 are located inside a metallic vacuum chamber 30, which has a hollow cylindrical neck 32 defining an opening into the vacuum chamber 30. First and second hermetically sealed electrical feedthroughs 34 and 36 extend through the wall of the vacuum chamber 30.

The negative side of the high voltage DC power source 26 is electrically connected to one side of an ammeter 38. The other side of the ammeter 38 is electrically connected through the first hermetically sealed feedthrough 34 to the plate 22. The negative side of the high voltage DC power source 26 is also electrically connected to the wall of the vacuum chamber 30, which is made of electrically conductive material.

The positive side of the high voltage DC power source 26 is electrically connected to one side of a resistor 40. The other side of the resistor 40 is electrically connected through the second hermetically sealed feedthrough 36 to the wire grid 24. In the preferred embodiment, the value of the resistor 40 is approximately 1M Ohm.

The particle injector illustrated in FIG. 2 includes a flat, highly transparent, coarse shield grid 42, which is located parallel to and above the top of the wire grid 24. The shield grid 42, which is made of a conductive metal, is located approximately two centimeters above the top of the wire grid 24. The shield grid 42 is electrically connected to the wall of the vacuum chamber 30, and is thus electrically connected to the negative side of the high voltage DC power source 26.

A flat, conductive metal plate 44 is located parallel to and below the bottom of the plate 22. The plate 44 is electrically connected to the wall of the vacuum chamber 30, and is thus electrically connected to the negative side of the high voltage DC power source 26.

The cylindrical neck 32 of the vacuum chamber 30 has an annular flange 46 located on the top thereof. A quartz vacuum window 48 is located on top of the flange 46, and is sealingly held in place by an annular cap member 50. The quartz vacuum window 48 is essentially transparent to UV light. The vacuum chamber 30 is sealed, in the preferred embodiment with a vacuum of approximately $10^{-6}$ Torr.

The UV light is supplied in the preferred embodiment from a 250 Watt Mercury arc lamp 52 operated at 30 Volts and 8 Amps. The light from the lamp 52 is focused by a flat-convex quartz lens 54, and is directed by a front surface mirror 56 through the quartz vacuum window 48 and onto the top surface of the plate 22. A removable glass plate 58 may optionally be placed in the path of the UV light between the flat-convex quartz lens 54 and the front surface mirror 56 to alter the characteristics of the UV light.

In operation, the particle injector of FIG. 2 is similar to the device shown in FIG. 1 and discussed above. The dielectric particles 20, which each weigh approximately 0.1 micrograms, have an initial charge to mass ratio of approximately 0.0004 Coulombs per kilogram. This corresponds to the field necessary to levitate the dielectric particles 20: the 50,000 Volt per meter field obtained with a 1000 Volt output from the high voltage DC power source 26 and the 2 centimeter spacing used.

The existence of positively charged dielectric particles 20 above the shield grid 42 as shown is most likely caused by two different factors. First, negatively charged dielectric particles 20 floating near the wire grid 24 may experience field emission and become positively charged. Second, when the UV energy is sufficiently high, photoemission from the dielectric particles 20 directly will increase, resulting in some positively charged dielectric particles 20.

Referring next to the alternate embodiment of FIG. 3, a particle injector is illustrated which will produce positively charged dielectric particles. In the embodiment of FIG. 3, small grains 60 of dielectric material are used instead of the dielectric particles 20 such as microballoons, although this is irrelevant to the technique used to produce positively charged particles instead of negatively charged particles.

The plate 22 is again used, and is again made of zinc in the preferred embodiment. The wire grid 24 is also used again, and is mounted in parallel fashion over the top surface of the plate 22. The space between the wire grid 24 and the top surface of the plate 22 is approximately two centimeters in the embodiment of FIG. 3.

A high voltage DC power source 62 having a variable output of up to 1000 Volts is used. The positive side of the high voltage DC power source 62 is electrically connected to the wire grid 24. The negative side of the high voltage DC power source 62 is electrically connected to one side of the ammeter 38. The other side of the ammeter 38 is electrically connected to the plate 22.

A Kaufman ion source 64 is used in the particle injector of FIG. 3 to provide a beam of Argon or Helium ions. The negative side of the high voltage DC power source 62 is electrically connected to the Kaufman ion source 64. The Argon or Helium ion beam from the Kaufman ion source 64 is directed onto the top surface of the plate 22 at a slight downward angle between the bottom of the wire grid 24 and the top of the plate 22, and also onto the side of the plate 22 as shown.

In the preferred embodiment, the width of the plate 22 and the wire grid 24 shown in FIG. 3 are approximately 25 centimeters. In this preferred embodiment, the distance from the Kaufman ion source 64 to the furthest of the grains 60 on the top surface of the plate 22 which are in the beam from the Kaufman ion source 64 is approximately 45 centimeters. It should, however, be noted that these dimensions are not presently viewed as being critical. The preferred voltage from the high voltage DC power source 62 is set to produce a reading on the ammeter 38 of approximately 140 microamps.

It may therefore be appreciated from the above detailed description of the preferred embodiment of the present invention that it teaches an apparatus and a method for injecting dielectric particles in a manner analogous to conventional particle injection of conductive droplets and particles.

The present invention accomplishes this in two stages. Initially, a charge is placed on the dielectric particles or droplets in order to provide a manner of controlling the ensuing movement of the dielectric particles or droplets.

Next, the appropriately charged dielectric particles or droplets are ejected into a desired area using electrostatic force. The charged dielectric particles or droplets are then maintained in the desired area through electrostatic confinement.

The present invention allows the dielectric particles or droplets to be charged either negatively or positively by varying the charging technique. The apparatus of the present invention is relatively compact and inexpensive, both to construct, and to operate and maintain as well. Finally, all of the aforesaid advantages and objectives of the present invention are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A particle injector for charging and ejecting dielectric particles or droplets, comprising:

a plate member made of a material which has a low work function, said plate member having a surface upon which dielectric particles or droplets may be placed;

a grid member located adjacent to and spaced away from said surface of said plate member upon which dielectric particles or droplets may be placed, said grid member being made of a conductive material;

means for biasing said grid member at a high voltage with respect to said plate member; and means for providing and directing ultraviolet light onto said surface of said plate member upon which dielectric particles or droplets may be placed to cause photoelectrons to be emitted from said plate member.

2. A particle injector as defined in claim 1, wherein said plate member is made of a material from the group consisting of zinc and nickel.

3. A particle injector as defined in claim 1, wherein said surface of said plate member is flat.

4. A particle injector as defined in claim 3, wherein said grid member is flat and parallel to said surface of said plate member.

5. A particle injector as defined in claim 1, wherein said grid member comprises: a highly transparent, coarse wire grid.

6. A particle injector as defined in claim 1, wherein said grid member is spaced approximately one to two centimeters away from said surface of said plate member.

7. A particle injector as defined in claim 6, wherein said grid member is spaced approximately two centimeters away from said surface of said plate member.

8. A particle injector as defined in claim 1, wherein said biasing means comprises:

a high voltage DC power supply having a positive side and a negative side.

9. A particle injector as defined in claim 8, wherein said high voltage DC power supply provides a variable DC output voltage.

10. A particle injector as defined in claim 8, wherein said positive side of said high voltage DC power supply is electrically connected to said grid member, and wherein said negative side of said high voltage DC power supply is electrically connected to said plate member.

11. A particle injector as defined in claim 10, wherein said high Voltage DC power supply biases said grid member to approximately 1000 Volts with respect to said plate member.

12. A particle injector as defined in claim 1, wherein said means for providing and directing ultraviolet light comprises:

a lamp for providing ultraviolet light; and means for focusing and directing said ultraviolet light from said lamp onto said surface of said plate member.

13. A particle injector as defined in claim 12, wherein said lamp generates ultraviolet light having a wavelength of between approximately 2000 and 3000 Angstroms.

14. A particle injector as defined in claim 12, wherein said lamp comprises:

a Mercury arc lamp.

15. A particle injector as defined in claim 12, wherein said means for providing and directing ultraviolet light additionally comprises:

means for altering the characteristics of the ultraviolet light provided by said lamp.

16. A particle injector as defined in claim 15, wherein said altering means causes ultraviolet light directed onto said surface of said plate member to have a wavelength of between approximately 2000 and 3000 Angstroms.

17. A particle injector as defined in claim 1, additionally comprising:

means for containing said plate member and said grid member, said containing means having a vacuum therein.

18. A particle injector as defined in claim 1, additionally comprising:

a shield grid located adjacent to and spaced away from the side of said grid member opposite said plate member, said shield grid being made of a conductive material.

19. A particle injector as defined in claim 18, wherein said shield grid is electrically connected to said plate member.

20. A particle injector for charging and ejecting dielectric particles or droplets, comprising:

a plate member made of a material which has a low work function, said plate member having a surface upon which dielectric particles or droplets may be placed;

a grid member located adjacent to and spaced away from said surface of said plate member upon which dielectric particles or droplets may be placed, said grid member being made of a conductive material;

means for biasing said grid member at a high positive voltage with respect to said plate member; and means for providing and directing ultraviolet light having a wavelength between 2000 and 3000 Angstroms onto said surface of said plate member upon which dielectric particles or droplets may be placed to cause photoelectrons to be emitted from said plate member, said photoelectrons becoming attached to said dielectric particles or droplets to cause said dielectric particles or droplets to become negatively charged.

21. A particle injector for charging and ejecting dielectric particles or droplets, comprising:

a plate member made of a material which has a low work function, said plate member having a surface upon which dielectric particles or droplets may be placed;

a grid member located adjacent to and spaced away from said surface of said plate member upon which dielectric particles or droplets may be placed, said grid member being made of a conductive material;

means for biasing said grid member at a high voltage with respect to said plate member; and means for providing and directing ultraviolet light onto said surface of said plate member upon which dielectric particles or droplets may be placed to cause photoelectrons to be emitted from said plate member, thereby causing dielectric particles or droplets on said surface of said plate member to become charged and to be ejected from said surface of said plate member.

22. A method of charging and ejecting dielectric particles or droplets, comprising:

providing a plate member made of a material which has a low work function, said plate member having a surface upon which dielectric particles or droplets may be placed;

locating a grid member adjacent to and spaced away from said surface of said plate member upon which dielectric particles or droplets may be placed, said grid member being made of a conductive material;

biasing said grid member at a high voltage with respect to said plate member; and directing ultraviolet light onto said surface of said plate member upon which dielectric particles or droplets may be placed to cause photoelectrons to be emitted from said plate member.

23. A method of charging and ejecting dielectric particles or droplets, comprising:

providing a plate member made of a material which has a low work function, said plate member having a surface upon which dielectric particles or droplets may be placed;

locating a grid member adjacent to and spaced away from said surface of said plate member upon which dielectric particles or droplets may be placed, said grid member being made of a conductive material;

biasing said grid member at a high voltage with respect to said plate member; and directing ultraviolet light onto said surface of said plate member upon which dielectric particles or droplets may be placed to cause photoelectrons to be emitted from said plate member, thereby causing dielectric particles or droplets on said surface of said plate member to become charged and to be ejected from said surface of said plate member.

24. A particle injector for charging and ejecting dielectric particles or droplets, comprising:

a plate member made of a material which has a low work function, said plate member having a surface upon which dielectric particles or droplets may be placed;

a grid member located adjacent to and spaced away from said surface of said plate member upon which dielectric particles or droplets may be placed, said grid member being made of a conductive material;

means for biasing said grid member at a high voltage with respect to said plate member; and a Kaufman ion source for directing a beam onto said surface of said plate member, thereby causing dielectric particles or droplets on said surface of said plate member to become charged and to be ejected from said surface of said plate member.

25. A method of charging and ejecting dielectric particles or droplets, comprising:

providing a plate member made of a material which has a low work function, said plate member having a surface upon which dielectric particles or droplets may be placed;

locating a grid member adjacent to and spaced away from said surface of said plate member upon which dielectric particles or droplets may be placed, said grid member being made of a conductive material;

biasing said grid member at a high voltage with respect to said plate member; and directing a beam from a Kaufman ion source onto said surface of said plate member, thereby causing dielectric particles or droplets on said surface of said plate member to become charged and to be ejected from said surface of said plate member.

* * * * *